United States Patent
Lieven et al.

(10) Patent No.: US 9,446,834 B2
(45) Date of Patent: Sep. 20, 2016

(54) SELF-STIFFENED SKIN FOR AIRCRAFT FUSELAGE INCLUDING STRINGERS WITH A CLOSED SECTION AND ASSOCIATED MANUFACTURING METHOD

(71) Applicant: Airbus Operations (SAS), Toulouse (FR)

(72) Inventors: Patrick Lieven, Fronton (FR); Romain Delahaye, Colomiers (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 322 days.

(21) Appl. No.: 14/140,513

(22) Filed: Dec. 25, 2013

(65) Prior Publication Data
US 2014/0186559 A1 Jul. 3, 2014

(30) Foreign Application Priority Data
Dec. 28, 2012 (FR) ...................................... 12 62947

(51) Int. Cl.
| | |
|---|---|
| B64C 1/06 | (2006.01) |
| B64C 1/12 | (2006.01) |
| B29D 99/00 | (2010.01) |
| B64C 1/00 | (2006.01) |

(52) U.S. Cl.
CPC ............ *B64C 1/068* (2013.01); *B29D 99/0014* (2013.01); *B64C 1/064* (2013.01); *B64C 1/12* (2013.01); *B64C 2001/0072* (2013.01); *Y02T 50/433* (2013.01); *Y10T 156/1052* (2015.01); *Y10T 428/13* (2015.01)

(58) Field of Classification Search
CPC ....... B64C 1/061; B64C 1/064; B64C 1/068; B64C 1/12; B64C 2001/0072; B64C 3/182; B64C 3/26
See application file for complete search history.

(56) References Cited

U.S. PATENT DOCUMENTS

| | | | | |
|---|---|---|---|---|
| 2,845,151 | A * | 7/1958 | Reinhold .................. | B64C 1/12 52/580 |
| 2,945,655 | A * | 7/1960 | Snyder ...................... | B64C 3/26 244/123.1 |
| 4,749,155 | A * | 6/1988 | Hammer ................... | B64C 3/26 244/119 |
| 5,496,002 | A * | 3/1996 | Schutze .................. | B64C 3/182 244/131 |
| 6,231,710 | B1 | 5/2001 | Herup et al. | |

(Continued)

FOREIGN PATENT DOCUMENTS

| | | |
|---|---|---|
| FR | 2766407 | 1/1999 |
| WO | 2012007780 | 1/2012 |

OTHER PUBLICATIONS

French Search Report, Jul. 24, 2013.

*Primary Examiner* — Tien Dinh
*Assistant Examiner* — Richard R Green
(74) *Attorney, Agent, or Firm* — Greer, Burns & Crain, Ltd.

(57) ABSTRACT

Simplification of the manufacture of composite material fuselages for aircraft, as well as mass reduction of fuselage sections and space optimization inside such fuselage sections. To accomplish this, it is proposed to use stringers of a new type which have a closed transverse section, and which are thus able to be self-positioned relative to one another by being positioned edge-to-edge on a stringer supporting structure, such as the outer surface of a mandrel. The installation of the stringers in grooves of conjugate shape is by this means made unnecessary. The stringers have cut-outs located between circumferential frames, and are able to house utility systems.

4 Claims, 7 Drawing Sheets

(56) References Cited

U.S. PATENT DOCUMENTS

| | | | |
|---|---|---|---|
| 6,355,337 B1* | 3/2002 | Piening | B64C 1/12 428/223 |
| 6,613,258 B1 | 9/2003 | Maison et al. | |
| 7,197,852 B2* | 4/2007 | Grillos | B64C 1/12 52/144 |
| 7,871,040 B2* | 1/2011 | Lee et al. | B64C 1/068 244/119 |
| 2009/0044914 A1 | 2/2009 | Pham et al. | |
| 2012/0132748 A1* | 5/2012 | Axford | B64C 3/26 244/119 |
| 2012/0223187 A1* | 9/2012 | Kismarton | B64C 1/068 244/120 |

* cited by examiner

SELF-STIFFENED SKIN FOR AIRCRAFT FUSELAGE INCLUDING STRINGERS WITH A CLOSED SECTION AND ASSOCIATED MANUFACTURING METHOD

CROSS-REFERENCES TO RELATED APPLICATIONS

This application claims the benefit of the French patent application No. 1262947 filed on Dec. 28, 2012, the entire disclosures of which are incorporated herein by way of reference.

BACKGROUND OF THE INVENTION

The invention also relates to a method for manufacturing a section of an aircraft fuselage including a self-stiffened skin produced by means of the above method.

The invention also relates to such a fuselage section, and also to an aircraft which including the same, such as an airplane.

In the present description the term "section" may designate any type of aircraft section, including a nose cone or tail cone.

Aircraft fuselages must be able to withstand the loads caused by pressurization and the loads transmitted by the engines.

To this end, the fuselages habitually include circumferential frames, also called "orbital frames", together with an aerodynamic skin, sometimes called a "self-stiffened skin", attached to these circumferential frames and fitted with longitudinal stiffeners, which are attached to an inner face of the skin, and which are generally called "stringers".

Stringers may have sections of varied types, for example T-shaped. I-shaped or Omega-shaped sections. In certain known configurations, these circumferential frames have a base plate which is attached directly to the inner face of the self-stiffened skin, in which case the frames have notches where the stringers are to pass. In other known configurations the stringers are interposed between the circumferential frames and the self-stiffened skin (the frames thus pass above the stringers), and angle pieces, commonly called "clips", are positioned between the stringers, and connect the circumferential frames to the self-stiffened skin.

An aircraft fuselage is generally formed from several sections attached end-to-end in the longitudinal direction of the aircraft. In each section the self-stiffened skin may be formed of several panels installed end-to-end circumferentially, or be formed of several half-shells assembled with one another. The self-stiffened skin may alternatively be made from a single piece. This latter configuration, commonly called a "full barrel" configuration, notably has the advantage that it avoids the presence of junctions extending longitudinally within this self-stiffened skin.

In the case of self-stiffened composite material skins, strengthening fibers impregnated with curable resin are draped over an assembly of pre-cured composite material stringers which have been positioned beforehand in their final configuration, in order to allow co-curing of the assembly constituted in this manner.

The positioning of the stringers requires sophisticated equipment, and is generally complex to implement, in particular when a monobloc self-stiffened skin is manufactured.

US patent application US 2009/0044914 A1 describes a method for manufacturing a monobloc self-stiffened skin of cylindrical shape fitted with Omega-section stringers. This method consists in preparing a mandrel, also having the shape of a cylinder, having longitudinal grooves with a complementary shape to that of the stringers. The pre-cured composite material stringers are positioned in the grooves of the mandrel such that the base plates of the stringers are flush with the cylindrical outer surface of the mandrel, and cores are positioned within the stringers to maintain their shape, after which strips of prepreg are draped on the outer surface of the mandrel, and therefore also on the base plates of the stringers, and the assembly is co-cured so as to obtain the monobloc self-stiffened skin.

However, the use of such a mandrel with grooves requires great precision when manufacturing the stringers and machining of the grooves of the mandrel.

In addition, it is in practice difficult to hold each stringer in position in its associated groove until the stringer is covered by a strip of prepreg.

The method thus proves complex, lengthy and expensive to implement.

Moreover, there is a need in mass reduction as regards aircraft fuselage skins.

There is also a need in space for accommodating utility systems.

SUMMARY OF THE INVENTION

The invention is based on a method of manufacturing a fuselage structure for an aircraft fuselage, including the following steps:

preparing a supporting structure, preparing pre-cured composite material stringers, each of which has a transverse section which is closed such that it has a first base plate and a second base plate which are separate from one another, and also two core webs respectively connecting pairs of lateral ends of said base plates, followed by installing the pre-cured stringers on said supporting structure, such that said first base plate of each stringer is resting on at least one outer surface of said supporting structure, and so as to constitute at least one assembly of stringers in which every consecutive pair of stringers in a transverse direction is such that a core of each of the stringers of said pair of stringers is applied against a core of the other stringer of said pair of stringers, followed by forming a composite material skin, called an outer skin, covering said second respective base plates of the stringers of each previously constituted assembly of stringers, followed by strengthening said outer skin and said stringers, so as to make said respective second base plates of said stringers adhere to said outer skin, followed by obtaining by this means a unitary fuselage structure formed from said outer skin and from said stringers, and in which said first respective base plates of said stringers jointly form a wall, called an inner wall, followed by separating said fuselage structure and said supporting structure.

The fuselage structure produced by means of the method according to the invention may be a portion of self-stiffened skin forming a fuselage panel or a half-shell or, in a particularly advantageous manner, a monobloc self-stiffened skin, i.e., one forming an integral structure with a closed section, for example one having a cylindrical shape (with circular transverse section), as will appear more clearly in what follows.

The expression "transverse direction" is understood to mean a direction orthogonal to a longitudinal direction of the stringers, this latter direction also defining a longitudinal direction of the produced structure.

The invention therefore proposes the use of stringers of a new type, the conformation of which allows the stringers to be stacked in a transverse direction.

The stringers, positioned on the outer surface of the supporting structure, are thus intrinsically positioned relative to one another.

By this means the invention enables the use of a supporting structure with grooves for the stringers to be avoided. The supporting structure used in the method according to the invention may thus be of low cost. In addition, the dimensional tolerances for the manufacture of the stringers may be relaxed.

The manufacturing method according to the invention is thus particularly simple to implement, and inexpensive.

In a preferred embodiment of the invention, the step consisting in installing the pre-cured stringers on said supporting structure is preceded by a step consisting in positioning, on said outer surface of said supporting structure, a composite material skin, called the inner skin.

In this case, in said step consisting in installing the pre-cured stringers on said supporting structure, said stringers are positioned on said inner skin, and the step consisting in strengthening said outer skin and said stringers also includes the simultaneous strengthening of said inner skin, so as to make said first respective base plates of said stringers to adhere to said inner skin.

The fuselage structure obtained on conclusion of the strengthening step thus also includes said inner skin, which forms said inner wall jointly with said respective first base plates of said stringers.

Installation of such an inner skin enables the self-stiffened skin obtained on conclusion of the present method to be given optimal cohesion. This notably enables the separation of this self-stiffened skin and the supporting structure to be facilitated.

In this case the supporting structure preferably has a single outer surface, extending longitudinally roughly to the same length as the stringers.

In another embodiment of the invention the supporting structure may include circumferential frames intended to be attached to the self-stiffened skin to form a section of an aircraft fuselage.

In this case each circumferential frame defines a corresponding outer surface of the supporting structure, in terms of the terminology of the invention.

In addition, in this other embodiment, the stringers are applied directly on to the outer surfaces defined respectively by said circumferential frames.

Said fuselage structure manufactured by means of the above method generally has a closed transverse section.

This fuselage structure may thus be a monobloc self-stiffened skin. It may be a self-stiffened skin of roughly cylindrical shape, for an intermediate fuselage section, or it may be a self-stiffened skin with a double curvature, for a fuselage nose cone or tail cone.

In all cases, the term "transverse section" is understood to mean a section in a plane orthogonal to a longitudinal direction defined by an average alignment of the stringers.

Said supporting structure advantageously takes the form of a mandrel having an outer surface extending over 360 degrees around a longitudinal axis of said mandrel.

If the structure is intended for the manufacture of an intermediate fuselage section, said outer surface of said mandrel may have the shape of a straight cylinder, in which case each stringer is also shaped like a straight cylinder.

The term "straight cylinder" must be understood in its wider mathematical sense, as the result of the projection of a curve which is closed in a direction orthogonal to the plane of said curve. The outer surface of the mandrel is thus not necessarily rotationally symmetrical.

Said stringers are preferably generally held on said supporting structure by means of at least one temporary retaining device, during the step of formation of the outer skin, and during the strengthening step.

The invention proposes a method for manufacturing a section of an aircraft fuselage, including in succession:

manufacture of at least one fuselage structure by means of a method of the type described above;

formation of a fuselage skin having a closed transverse section, by means of said at least one fuselage structure, installation of circumferential frames within a space delimited by said fuselage skin, and attachment of said circumferential frames to said inner wall of said at least one fuselage structure forming said fuselage skin.

The term "fuselage skin" is understood to mean a skin formed from an assembly of several fuselage structures produced by means of a method of the type described above, where each fuselage structure is in the shape of a panel or of a half-shell, in which case the step of "formation of a fuselage skin" is the step when these structures are assembled.

As a variant, and preferentially, the "fuselage skin" may be a monobloc self-stiffened skin, i.e., a skin formed from a single fuselage structure produced by means of a method of the type described above, and having a closed transverse section. In this case the step of "formation of a fuselage skin" is intrinsically accomplished by said method of manufacturing the fuselage structure.

In all cases the fuselage skin thus has a closed transverse section.

In addition, the circumferential frames may be attached to said fuselage skin after forming the fuselage skin.

As a variant, the circumferential frames may be attached to said fuselage skin jointly with the formation of the fuselage skin, if the fuselage skin is formed of a single monobloc structure, and if the supporting structure incorporates the circumferential frames, as explained above.

According to the invention, said method includes making at least one cut-out in said inner wall, located between said two cores of at least one of said stringers, and between two of said circumferential frames arranged consecutively.

As explained above, said inner wall is formed jointly by the first respective base plates of said stringers and, if applicable, by said inner wall.

Each cut-out made in this manner provides access to the interior of the corresponding stringer, which notably facilitates inspection of the condition of the stringer during subsequent maintenance operations.

Each cut-out stops before any circumferential frame so as to enable the attaching of each circumferential frame on said inner wall of said at least one fuselage structure forming said fuselage skin.

In a particularly advantageous manner the invention allows a fuselage section of the integral type, also called a "full barrel" section, to be manufactured.

In this case said fuselage skin is formed from a single monobloc fuselage structure, i.e., one with a closed transverse section.

The invention is also based on a fuselage structure for an aircraft fuselage, including a composite material skin, called an outer skin, and composite materials stringers adhering to one face of said skin.

Each of said stringers includes at least one first base plate positioned on a side opposite said outer skin, where a second base plate adheres to said outer skin, together with two cores respectively connecting, in pairs, the lateral ends of said base plates.

In addition, said stringers are distributed into at least one assembly of stringers in which every pair of consecutive stringers is such that a core of each of the stringers of said pair of stringers is applied against a core of the other stringer of said pair of stringers.

This fuselage structure has the advantage that it can be produced easily and at a reduced cost by means of a method of the type described above.

This fuselage structure may thus be a fuselage panel, a self-stiffened skin having the shape of a half-shell, or again a monobloc self-stiffened skin for an integral fuselage section.

By definition, said respective first base plates of said stringers jointly form an inner wall of said fuselage structure.

In addition, the cores of the stringers preferably extend in respective directions normal to said base plates of the stringers.

In addition, said fuselage structure also advantageously includes a composite material skin, called an inner skin, to which said first respective base plates of said stringers adhere.

In this case, said inner skin forms part of the abovementioned inner wall.

The invention also proposes a fuselage section for an aircraft, including a fuselage skin formed from at least one fuselage structure of the type described above, together with circumferential frames fitted inside a space delimited by said fuselage structure, and attached to said inner wall of said at least one fuselage structure forming said fuselage skin.

According to the invention, said inner wall of said at least one fuselage structure forming said fuselage skin preferably includes at least one cut-out located between two cores of at least one of said stringers and between two of said circumferential frames arranged consecutively.

As explained above, such a cut-out provides access to the interior of the corresponding stringer, while allowing the inner wall to form circumferential support surfaces, on to which the circumferential frames may be respectively applied, and to which they may be attached.

Each stringer of said structure preferably includes multiple such cut-outs.

At least one of said stringers preferably has at least one aperture for receiving a view port emerging through the first and second base plates of the stringer.

Finally, the invention relates to an aircraft including at least one fuselage section of the type described above.

In addition, the aircraft advantageously includes at least one utility system housed at least partly in an interior space of at least one of said stringers.

Indeed, due to their conformation with a closed transverse section the stringers enable equipment such as electrical cable bundles, oil or air pipes, etc., to be held in them.

BRIEF DESCRIPTION OF THE DRAWINGS

The invention will be better understood, and other details, advantages and characteristics of it will appear, on reading the following description given as a non-restrictive example, with reference to the appended illustrations, in which.

In all these figures, identical references can designate identical or comparable elements.

DETAILED DESCRIPTION OF THE PREFERRED EMBODIMENTS

FIGS. 1 to 6 illustrate a method for manufacturing a structure for an aircraft fuselage according to a preferred embodiment of the invention, in a special case in which said structure is a composite material self-stiffened skin, of the monobloc type, i.e., forming a structure with a closed section, also called a "full barrel" structure. In the illustrated example this self-stiffened skin thus has the shape of a cylinder of revolution.

The term "composite material" is understood to mean a material formed from strengthening fibers, such as carbon or glass fibers, embedded in a hardened resin, such as epoxy.

Figure 1:
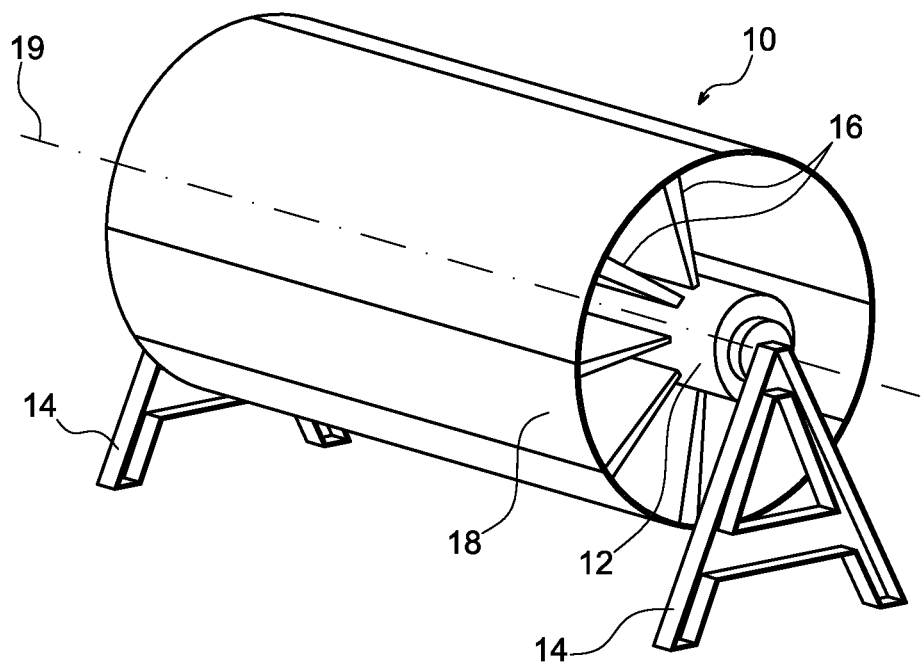
FIG. 1 is a schematic perspective view of the mandrel intended for a method for manufacturing a monobloc self-stiffened skin for an aircraft fuselage.

The method firstly includes the preparation of a supporting structure, which in the illustrated example has the form of a mandrel 10, as illustrated in FIG. 1.

This mandrel 10 globally includes a central shaft 12 supported by two trestles 14, and from which radiate spokes 16 supporting an outer wall having a cylindrical shape, defining an outer surface 18 of the mandrel. Central shaft 12 can be rotated around a longitudinal axis 19 of mandrel 10.

Mandrel 10 may be manufactured by conventional techniques known to those skilled in the art, which will not be described in the present description.

Figure 2:
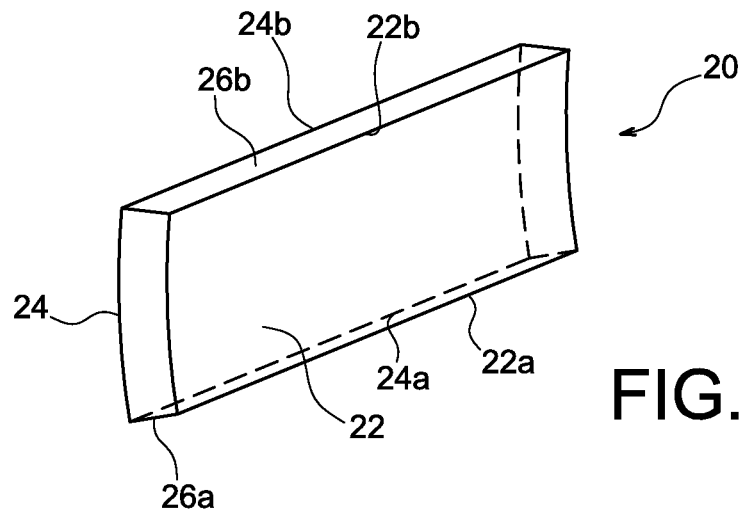
FIG. 2 is a schematic perspective view of a stringer intended for said method.

The method also includes the preparation of multiple composite material stringers 20, each of which includes a first base plate 22 and a second base plate 24, which are separated from one another, together with two cores 26a, 26b, as shown in FIG. 2. Core 26a mutually connects two respective first lateral ends 22a, 24a of first and second base plates 22 and 24, while core 26b mutually connects two respective second lateral ends 22b, 24b of first and second base plates 22 and 24.

Each of base plates 22 and 24 has the shape of a portion of a cylinder, i.e., the shape of a curved rectangular plate, while each of core webs 26a and 26b has the shape of a flat rectangular plate, and extends in a radial direction, i.e., in a direction normal to base plates 22 and 24.

Each stringer 20 thus has a closed transverse section.

Stringers 20 are advantageously produced by means of a pultrusion technique, and are pre-cured in order to give the stringers sufficient rigidity to enable them to be handled, whilst allowing subsequent co-curing of the stringers, as will appear more clearly in what follows.

As a variant, the stringers may be produced by a braiding technique, or by any other means of production enabling profiles of square section to be obtained.

Each stringer 20 is preferably strengthened temporarily by means of a preformed core, or an assembly of particles such as beads, positioned within stringer 20.

Figure 3:
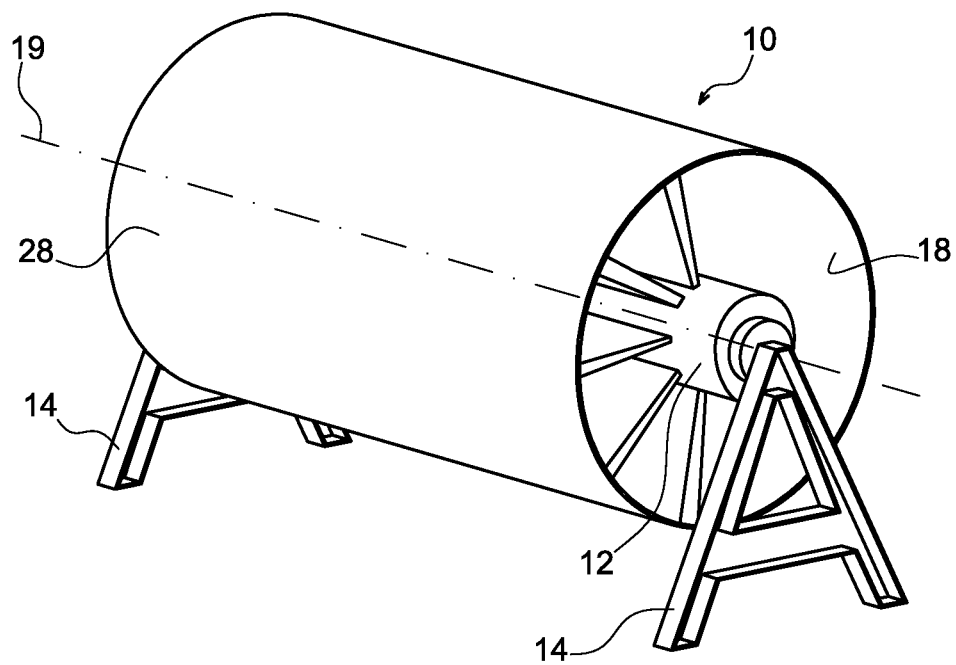
FIG. 3 is a schematic perspective view of the mandrel of FIG. 1, on conclusion of a step of said method consisting in positioning an inner skin on the mandrel.

In addition, the method includes the draping of strips of prepreg on outer surface 18 of mandrel 10 to form an inner skin 28, as can be seen in FIG. 3.

Figure 4:
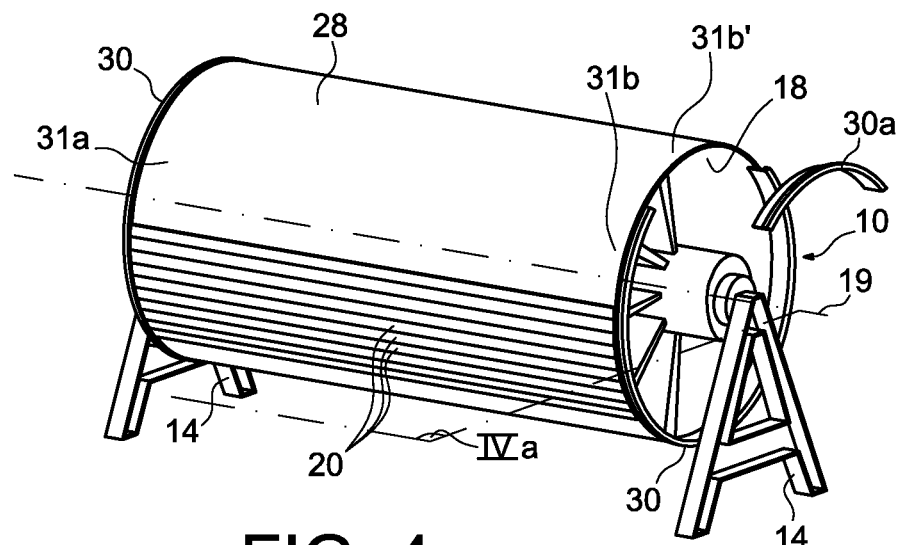
FIG. 4 is a view similar to FIG. 1, illustrating a subsequent step of said method consisting in positioning stringers such as the stringer of FIG. 2 on the mandrel.

The method then includes the installation of pre-cured stringers 20 on inner skin 28 covering outer surface 18 of mandrel 10, as illustrated in FIG. 4.

More specifically, stringers 20 are stacked circumferentially on top of one another, such that first base plate 22 of each stringer is resting on inner skin 28, and therefore on outer surface 18 of mandrel 10. The term "circumferential stacking" is understood to mean that two consecutive stringers are in mutual contact through their cores 26a, 26b facing one another.

As stringers 20 are installed they are preferentially held radially on mandrel 20 by means of temporary holding devices.

Figure 4A:
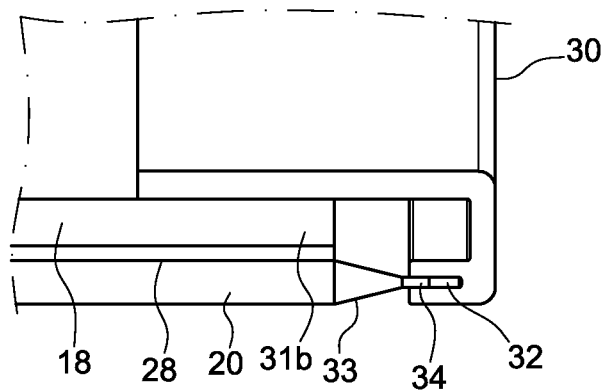
FIG. 4a is a partial schematic sectional view in plane IVa of FIG. 4, illustrating a longitudinal end of a stringer, together with a ring holding the stringer on the mandrel.

These temporary holding devices take the form, for example, of two rings 30 (FIG. 4) which are installed respectively on edges 31a, 31b of longitudinal ends of the mandrel, and each of which has an annular groove 32 which is open in the direction of the mandrel (FIG. 4a). Each stringer 20 is fitted with two cowls 33 (one of which can be seen in FIG. 4a), respectively installed on the longitudinal ends of the stringer, and each having a pin 34 protruding towards the exterior of stringer 20, and parallel to the longitudinal direction of this stringer (FIG. 4a). Rings 30 thus enable stringers 20 to be held in the radial direction. It should be noted that the stringers are held in the circumferential direction through the stringers' contact against one another through their respective cores 26a, 26b.

Rings 30 are attached to mandrel 10 for example by means of screws installed in the cylindrical wall of the mandrel, from inside the latter. As a variant, rings 30 may be attached to shaft 12 of the mandrel, or be installed sliding on this shaft 12.

Each of rings 30 is preferentially formed by multiple sectors. Removing at least one 30a of the sectors of at least one of the rings (FIG. 4) facilitates the installation of stringers 20 on mandrel 10. It is, indeed, then possible to pass the stringers through uncovered portion 31b' of the corresponding edge 31b of mandrel 10, and then to slide them circumferentially in the grooves formed by the ring sectors already in position.

As a variant, the temporary holding devices may take the form of two annular rows of connected hooks, respectively positioned on edges 31a, 31b of longitudinal ends of the mandrel, where each of these hooks can be moved between an unlocking position allowing a stringer 20 to be installed, and a locking position allowing this stringer to be held in place radially.

Other types of temporary holding devices may be used without going beyond the scope of the invention.

Stringers 20' of a particular type (FIGS. 5 and 5a) are installed to form a view port reception structure. Stringers 20' have a structure similar to that of other stringers 20 described above, but are shorter in length with a greater circumference. In addition, each of these stringers 20' incorporates a view port aperture 36 intended for subsequent installation of a view port (FIG. 5a). View port aperture 36 of each stringer 20' emerges in its first and second base plates 22, 24. Stringers 20' are positioned end-to-end in a longitudinal direction to form a longitudinal structure 38 for receiving view ports of a length roughly equal to the length of other stringers 20.

As a variant, each of stringers 20' may include several view port apertures 36. In this case, these stringers 20' advantageously incorporate transverse rigidification ribs, i.e., circumferential ribs, positioned between view port apertures 36. In particular, structure 38 for receiving view ports may be formed from a single stringer 20' including all the view port apertures 36 of this structure 38.

Installation of stringers 20, 20' continues, such that these stringers cover the entire circumference of inner skin 28, and therefore also outer surface 18 of mandrel 10.

Stringers 20 and 20' then form an assembly of contiguous stringers, in which every pair of circumferentially consecutive stringers 20 and/or 20' is such that a core 26a, 26b of each stringer is applied against a core 26b, 26a of the other stringer. It should be noted that the circumferential direction is a special case of a transverse direction, i.e., one orthogonal to the longitudinal direction of stringers 20.

There are, for example, two such structures 38 for receiving view ports, positioned symmetrically either side of a vertical median plane of mandrel 10.

Figure 5:
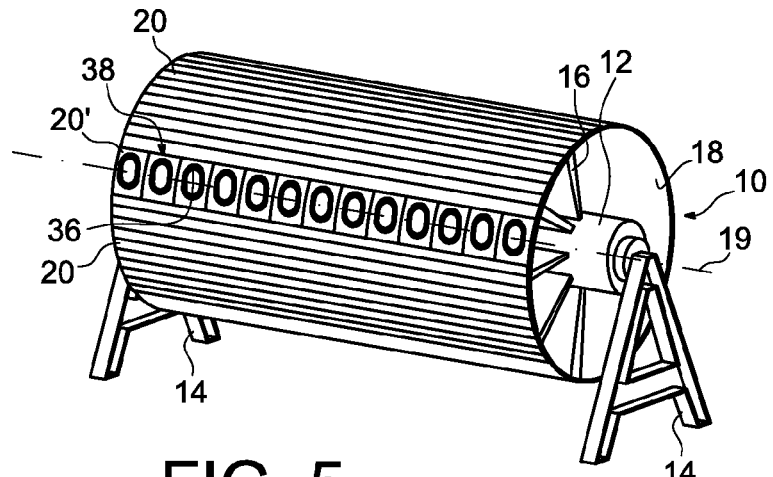
FIG. 5 is a view similar to FIG. 1, illustrating the positioning of stringers of the type of FIG. 2 on the mandrel after a strip of view ports has been placed in position between two stringers.
Figure 5A:
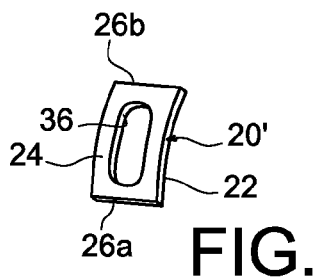
FIG. 5a is a view at a larger scale illustrating a stringer incorporating a view port reception aperture.

It should be noted that rings 30 are not represented in FIG. 5 for reasons of clarity.

Figure 6:
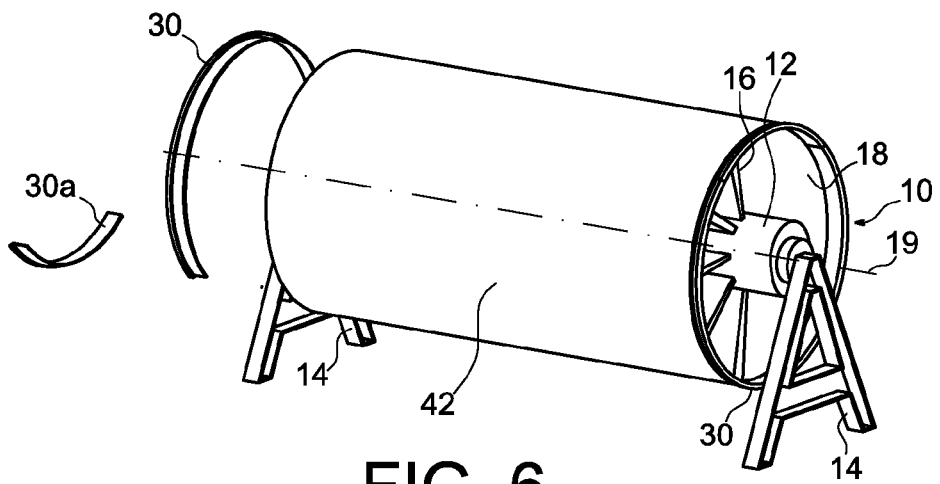
FIG. 6 is a view similar to FIG. 1, on conclusion of a subsequent step of said method, consisting in forming an outer skin covering the stringers.

The method continues with the draping of strips of prepreg on second respective base plates 24 of stringers 20 and 20', so as to form an outer skin 42, which can be seen in FIG. 6. This outer skin 42 is designed to have a structural function, i.e., to be capable of withstanding mechanical loads during flight.

The method then continues by strengthening the assembly consisting of the inner skin 28, stringers 20 and 20', and outer skin 42, by means of a known technique, for example by co-curing in an autoclave. This strengthening causes second respective base plates 24 of stringers 20 and 20' to adhere to outer skin 42, and first respective base plates 22 of stringers 20 and 20' to adhere to inner skin 28.

The composite material monobloc self-stiffened skin obtained on conclusion of the previous strengthening step is then separated from mandrel 10, after rings 30 holding stringers 20 and 20' on the mandrel have been disengaged.

If present, the cores or assemblies of particles are removed from the interior of stringers 20, 20'.

Inner skin 28 and outer skin 42 are then machined to form an aperture facing each frame of each view port 36.

It should be noted that inner skin 28 and first respective base plates 22 of stringers 20 jointly form an inner wall of the monobloc self-stiffened skin, in terms of the terminology of the invention.

The entire method described above is advantageously implemented by means of robotic systems, the design of which may be devised by conventional techniques, and which is not an object of the present invention.

The manufacture of the monobloc self-stiffened fuselage skin described above is a first step of a method for manufacturing a section of a fuselage for an aircraft according to the invention.

This latter method then includes the installation of circumferential frames inside the space delimited by the self-stiffened fuselage skin, followed by the attachment of the circumferential frames on the inner wall of this self-stiffened skin. These circumferential frames have, for example, an I-shaped section.

This method also includes making cut-outs of the inner wall, where each cut-out is located between two cores of a corresponding stringer 20, and between two consecutive circumferential frames. In this case the inner wall is formed of inner skin 28 and of first base plates 22 of stringers 20; each cut-out involves both inner skin 28 and first base plate 22 of a stringer 20.

These cut-outs allow the structure to be lightened overall, and also provide a means of access to the interior of the stringers in question, for maintenance operations and for the installation of utility systems inside the stringers.

FIGS. 7 to 11 illustrate fuselage section 44 obtained in this manner.

Figure 7:
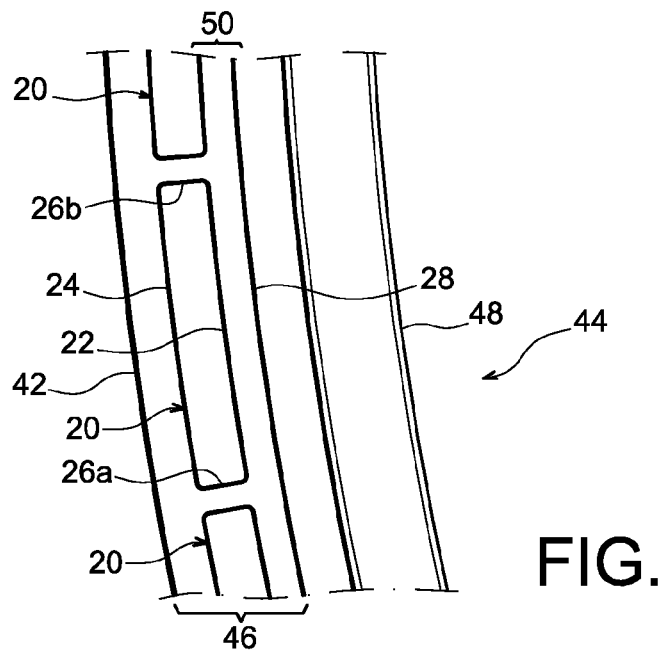
FIG. 7 is an exploded partial transverse section schematic view of an aircraft fuselage section including a self-stiffened skin obtained by means of said method.

As the exploded view of FIG. 7 shows more particularly, this fuselage section includes self-stiffened skin 46 and circumferential frames 48.

Figure 8:
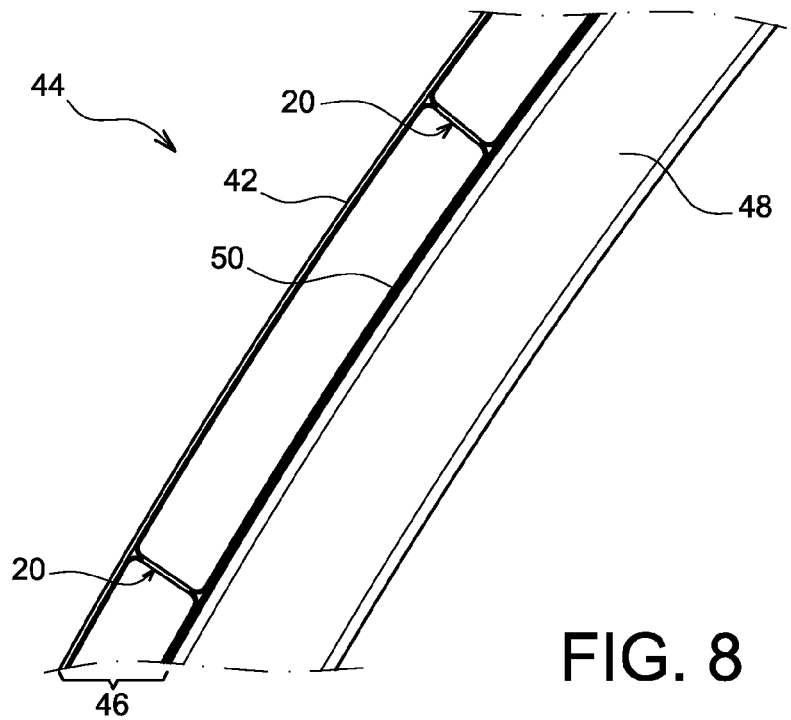
FIG. 8 is a partial schematic transverse section view of the fuselage section of FIG. 7.

FIG. 8 notably illustrates the unitary character of inner wall 50 obtained by the adhesion of first base plates 22 of stringers 20 on inner skin 28.

Figure 9:
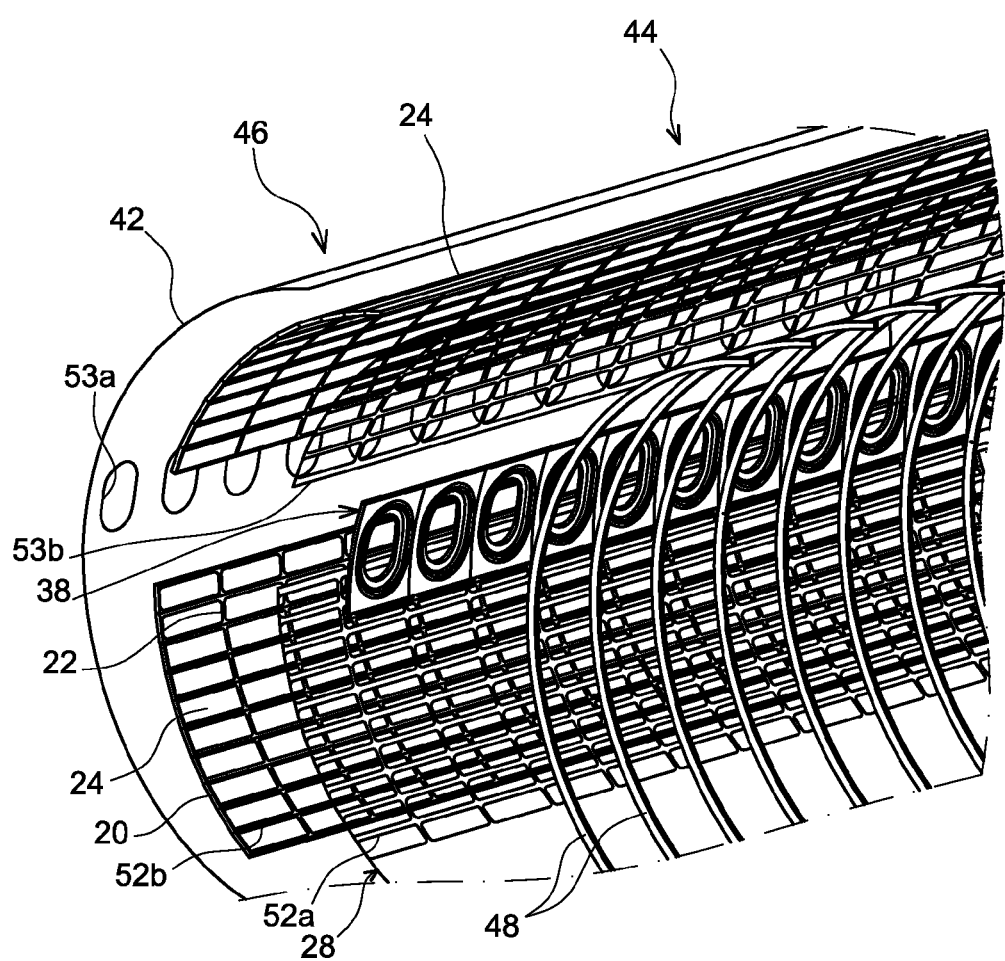
FIG. 9 is an exploded partial schematic perspective view of the fuselage section of FIG. 7.
Figure 10:
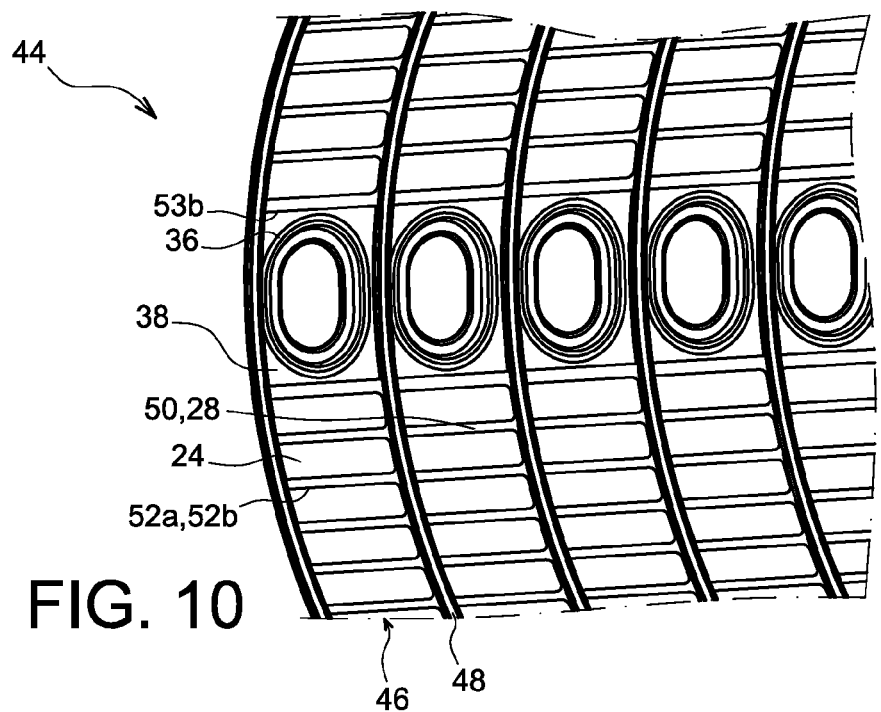
FIG. 10 is a partial perspective schematic view of an inner side of the fuselage section of FIG. 7.

FIGS. 9 and 10, illustrating a portion of fuselage section 44, also enable the cut-outs of inner wall 50 to be distinguished. Each of these cut-outs is formed of a cut-out 52a of inner skin 28 and of a cut-out 52b of first base plate 22 of a corresponding stringer 20.

FIG. 9 also reveals apertures 53a formed in outer skin 42 opposite each view port aperture 36, together with a longitudinal cut-out 53b of inner skin 28, extending for example along the entire length of this inner skin 28, facing structure 38 for receiving view ports.

The method may also include the installation of a view port within each view port aperture 36.

Figure 11:
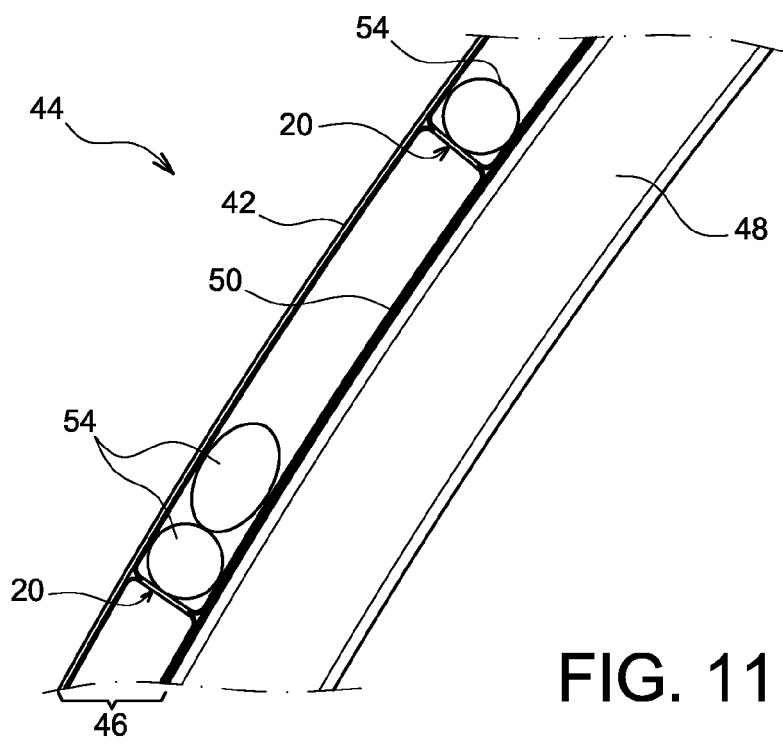
FIG. 11 is a view similar to FIG. 8, illustrating ancillary equipment held in stringers of said self-stiffened skin.

Fuselage section 44 notably has the advantage that it allows utility systems 54 to be incorporated in internal space 56 of one or more stringers 20, as is illustrated by FIG. 11. Such systems or equipment can thus be distributed in optimal fashion around a longitudinal axis of fuselage section 44.

The above detailed description illustrates the manufacture of an intermediate fuselage section of cylindrical shape and circular section, but the method according to the invention may also be used to manufacture a fuselage section of cylindrical shape and of non-circular section, or again for the manufacture of a double-curvature fuselage section, such as a nose cone or a tail cone. In this case, the complex double-curvature geometry of the structure may be obtained through the use of stringers of different lengths and/or through the use of stringers of tapering shape, i.e., stringers having a transverse section which becomes smaller towards one of the stringer's longitudinal ends.

The shape of the outer surface of the mandrel is in all cases made to match the form of the structure to be produced.

In addition, circumferential frames 48 can be previously incorporated in supporting structure 10, such that they are attached to self-stiffened skin 46 jointly with the manufacture of the latter. The final step of separation of self-stiffened skin 46 and of supporting structure 10 then includes the separation of circumferential frames 48 from said supporting structure 10.

Furthermore, the mandrel may be aligned in a direction which is not parallel to a horizontal plane, for example in a vertical direction.

In addition, the method according to the invention may also be used for the manufacture of a fuselage section made of several panels, in which case the supporting structure may be a single plate, whether or not curved.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A fuselage section for an aircraft, including a fuselage skin formed from at least one structure including a composite material skin, called an outer skin, and composite material stringers adhering to one face of said outer skin, wherein each of said stringers includes at least:
   a first base plate positioned on a side opposite said outer skin,
   a second base plate adhering to said outer skin, and
   two webs respectively connecting, in pairs, lateral ends of said base plates,
   wherein said stringers are distributed into at least one assembly of stringers in which every pair of consecutive stringers is such that one of said webs of each of the stringers of said pair of stringers is applied against one of said webs of the other stringer of said pair of stringers,
   wherein said first respective base plates of said stringers jointly form a wall, called an inner wall of said fuselage skin,
   the fuselage section further including circumferential frames positioned inside a space delimited by said fuselage skin and attached to said inner wall of said at least one fuselage structure forming said fuselage skin,
   wherein said inner wall of said at least one fuselage structure comprises at least one cut-out located between longitudinal ends of at least one of said stringers between said two webs of the at least one of said stringers and between two of said circumferential frames arranged consecutively, wherein the cut-out forms an access to an internal space of the at least one stringer.

2. The fuselage section according to claim 1, in which at least one of said stringers is fitted with at least one view port aperture emerging through the first and second base plates of the stringer.

3. An aircraft, including at least one fuselage section according to claim 1.

4. The aircraft according to claim 3, further including at least one utility system held at least partly in an interior space of at least one of said stringers.

\* \* \* \* \*